United States Patent [19]

Fowles et al.

[11] Patent Number: 4,497,104
[45] Date of Patent: Feb. 5, 1985

[54] SEPARATION DEVICE MANUFACTURE

[75] Inventors: Tom A. Fowles, McHenry, Ill.; Robert Lee, Plymouth, Minn.; Frank M. Richmond, Harvard, Ill.; Henry Tobiasz, Arlington Hts., Ill.

[73] Assignee: Baxter Travenol Laboratories, Inc., Deerfield, Ill.

[21] Appl. No.: 451,113

[22] Filed: Dec. 20, 1982

[51] Int. Cl.³ .......................................... B23P 17/00
[52] U.S. Cl. .................................. 29/419 R; 264/510; 264/527; 264/536; 210/321.1
[58] Field of Search ................... 29/527.3, 419; 210/321.1, 321.2, 321.3; 55/158, 16; 422/48; 264/510, 527, 536

[56] References Cited

U.S. PATENT DOCUMENTS

| Re. 23,564 | 10/1952 | Hobson | 264/527 X |
| 3,442,002 | 5/1969 | Geary, Jr. et al. | 29/450 |
| 3,492,698 | 2/1970 | Geary, Jr. et al. | 18/26 |
| 4,007,242 | 2/1977 | Lorgé et al. | 264/536 X |
| 4,227,295 | 10/1980 | Bodnar et al. | 29/527 |
| 4,227,295 | 10/1980 | Bodnar et al. | 29/527.3 |
| 4,246,227 | 1/1981 | Crosby et al. | 264/541 X |

FOREIGN PATENT DOCUMENTS 57-19003 2/1982 Japan.

Primary Examiner—Carl E. Hall
Assistant Examiner—John T. Burtch
Attorney, Agent, or Firm—Garrettson Ellis; Paul C. Flattery; John Kirby

[57] ABSTRACT

A method for making a hollow fiber separation device including the steps of forming an integral structure which comprises at least one tubular housing portion and an elongated chamber portion extending in elongated relation to the tubular housing portion and communicating with the housing portion adjacent opposed ends thereof. One provides an aperture in a central area of the elongated chamber and inserts hollow fibers for diffusion into the housing portion. One then provides closed ends to the housing portion and spins the structure on an axis between the ends, adding potting compound to the chamber portion through the aperture. Accordingly, the potting compound migrates radially outwardly through the chamber to the closed ends of the housing portion, to encase the ends of the hollow fibers in the potting compound. After curing of the potting compound, the ends of the tubular housing portion may be transversely cut to expose open bores of the hollow fibers, and flow manifold end cap members applied to the cut tubular housing ends.

11 Claims, 5 Drawing Figures

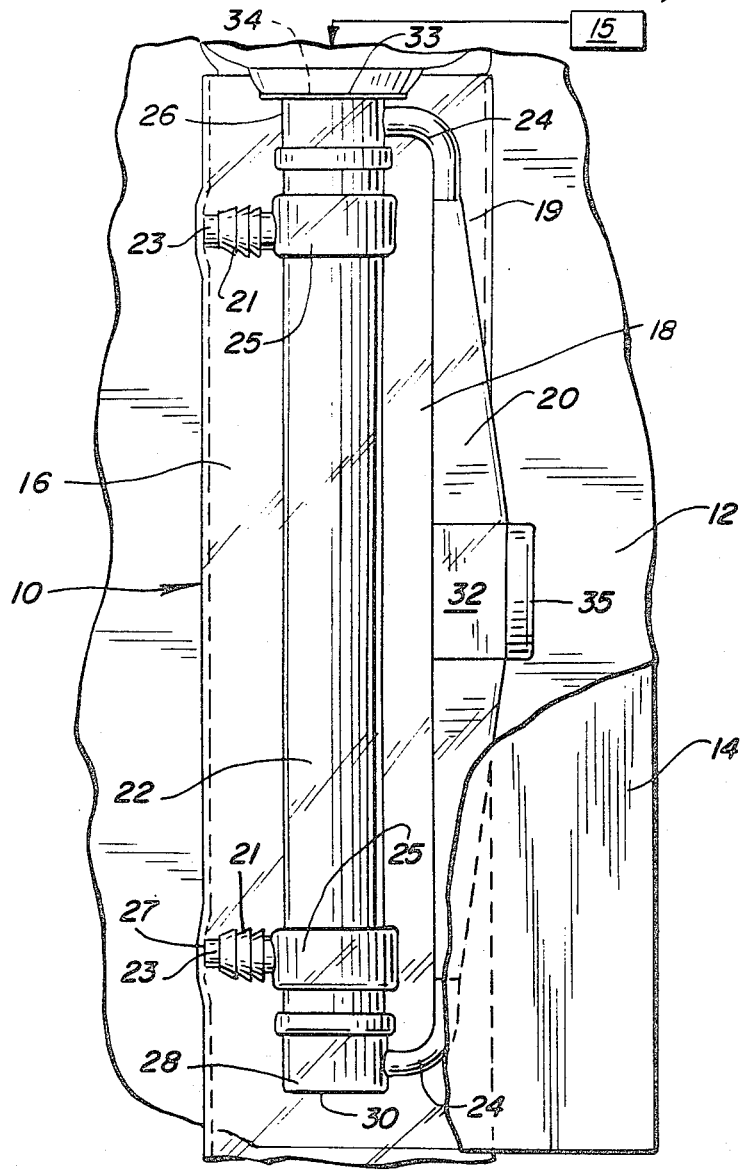
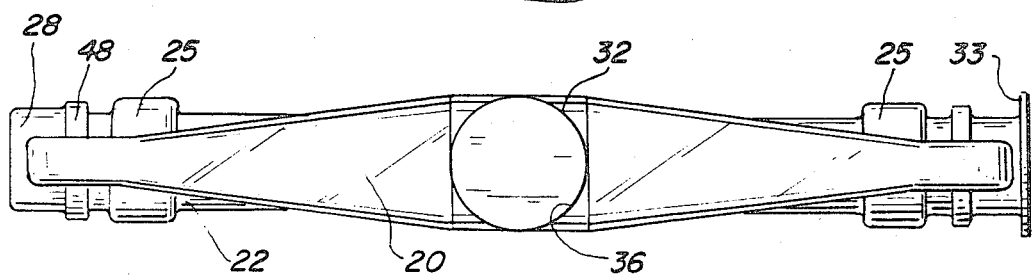
FIG. 1
FIG. 2

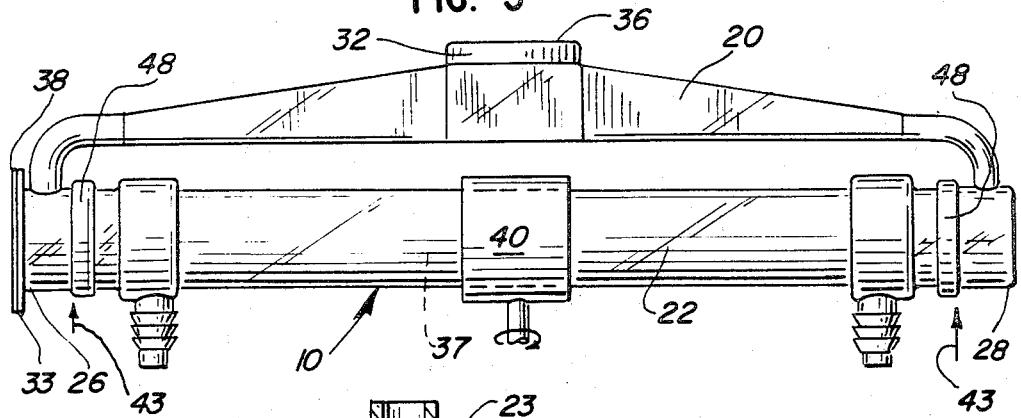
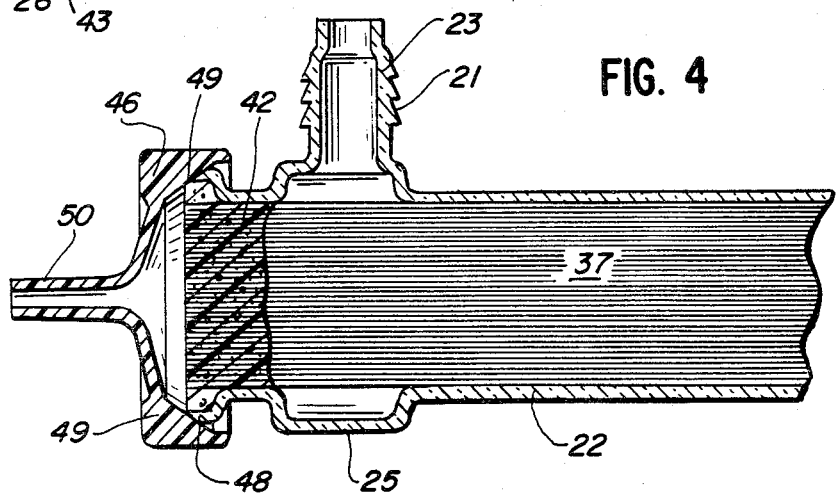
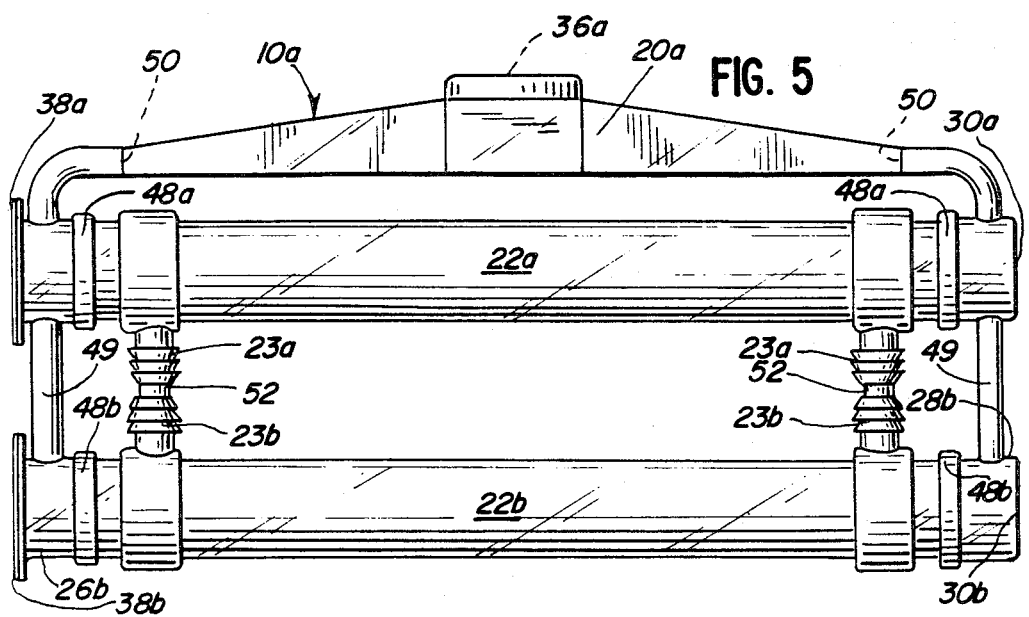

SEPARATION DEVICE MANUFACTURE

TECHNICAL FIELD

Hollow fiber diffusion devices are in widespread commercial use as artificial kidneys in which blood is dialyzed to remove biochemical breakdown products in uremic patients. Also, hollow fiber diffusion devices find other uses, for example, membrane plasmapheresis and other diffusion systems, including filtration or any other system for the separation of materials.

U.S. Pat. No. 4,227,295 shows a current technique for the manufacture of hollow fiber devices with respect to the step of insertion of potting compounds at the two ends of the tubular casing, with the hollow fibers inserted therein so that the ends of the casing are potted and then cut open so that bores of the fibers are open to the exterior at opposed ends of the casing. Other conventional techniques for the potting of the hollow fiber diffusion devices are shown in U.S. Pat. Nos. 3,492,698 and 3,442,002, cited and discussed in the first mentioned patent.

By the technique of the first-mentioned patent, a potting boat is attached to the casing which holds the hollow fibers. The casing ends are then spun while curable liquid sealent migrates from the potting boat through side entry ports into the closed ends of the casing. Thereafter, the ends of the casing are transversely cut through to open the ends of the hollow fibers and to form a smooth end face of potting compound and open hollow fibers, which are then closed with an end cap.

In accordance with this invention, improvements in manufacturing economies are achieved by a technique which simultaneously forms one or more casings integrally with the potting boat. This results in a significant reduction in the cost of manufacture of hollow fiber separation devices, for example diffusion devices or filters, in that the casings may be more inexpensively manufactured, and also the prior assembly step of adding a potting boat to the system for the potting step is eliminated. While cost is eliminated by this invention, the overall output of separation devices can also be increased if desired by the use of a single integral potting boat and multiple casings of a centrifuge.

DESCRIPTION OF INVENTION

In accordance with this invention a method for making a hollow fiber separation device is provided. The invention comprises the steps of forming an integral structure which comprises at least one tubular housing portion (and if desired two or three or more housing portions in communication with each other) plus an elongated chamber portion extending in elongated relation to the tubular housing portion or portions and communicating with the housing portion or portions adjacent opposed ends thereof.

An aperture is provided in a central area of the elongated chamber. One inserts the hollow fibers for diffusion into each housing portion, and provides closed ends to the housing portion.

Potting compound is then added to the chamber portion through the aperture, and the entire structure is spun about an axis between its ends to cause the potting compound to migrate radially outwardly through the chamber to the closed ends of the housing portion or portions present, to encase the ends of the hollow fibers in potting compound.

After this the potting compound is cured and, as in previous techniques, the ends of the tubular housing are transversely cut through the potting compound to expose open bores of the hollow fibers, and the chamber portion is removed. Flow manifold end cap members are then applied to the cut, tubular housing ends.

A plurality of tubular housing portions may be formed in the integral structure, with the chamber portion and housing portions defining interconnecting channel means extending between areas adjacent the respective ends thereof for flow communication. Accordingly, upon spinning of the integral structure, potting compound can migrate from the elongated chamber portion into all of the housing portions present, for simultaneous potting of the ends thereof. Thus, a plurality of hollow fiber separation devices can be manufactured with a single centrifugation step. The result of this is potential doubling and tripling of the production yield from each centrifugation step.

Flow manifold members may be applied in abutting, sealed relation to the housing ends by heat sealing or the like for an improved seal.

DESCRIPTION OF DRAWINGS

FIG. 1 is a partially schematic elevational view of an integral blow molded structure made in accordance with this invention.

FIG. 2 is a view taken along line 2—2 of FIG. 1.

FIG. 3 is an elevational view of the integral structure of this invention, mounted in a centrifuge for spinning.

FIG. 4 is an enlarged, fragmentary longitudinal sectional view of one end of the finished structure.

FIG. 5 is an elevational view of a modified integral structure of this invention, containing a plurality of tubular housings.

DESCRIPTION OF SPECIFIC EMBODIMENT

Referring to FIGS. 1 and 2, a blow molded, integral structure 10 is disclosed which may be molded between separate blow mold halves 12, 14 by the inflation of a tubular parison with air or other fluid from a source 15 in conventional manner. However, in accordance with this invention, the tubular parison which becomes integral structure 10 is pressed by mold halves 12, 14 to define substantially solid, flat areas 16, 18, 19, for example, while the remainder of the parison forms enlarged, hollow areas integrally attached to each other: specifically, elongated chamber portion 20 and tubular housing portion 22, both being made out of the same tubular parison.

Alternatively, as a substitute for blow molding, the integral structure of this invention may be thermoformed, or manufactured in any other desired manner.

Elongated chamber portion 20 defines hollow ends 24 which respectively communicate with hollow housing portion 22 at its ends 26, 28. End 28 of housing portion 22 may have a closed end wall 30 formed by the blow molding operation, while end 26 may define open aperture 34 at its end for access of the air which inflates the parison to form members 20, 22. Aperture 34 may be surrounded by flange 33 as a sealing surface.

Housing portions 22 may carry side ports 23 which are also formed in the blow molding process by mold halves 12, 14. Side ports 23, in turn, optionally carrying annular barbs 21 for connecting with flexible tubing, may communicate with enlarged, tubular manifold chambers 25 which are also defined in the blow molding process. Ports. 23 may have initially closed outer ends 27, which are cut open during the manufacturing process.

Elongated chamber portion 20 may define a central well portion 32 defining an end wall 35. After the blow molding step is complete and integral structure 10 is removed from the mold, an aperature 36 may be cut in end wall 35 to serve as an entry port for potting compound in a further stage of processing.

Also, a flat member 38 may be heat sealed (ultrasonic), solvent bonded, or otherwise attached to flange 33 to close open end 26 of tubular housing portion 22, after a bundle 37 of hollow fibers has been inserted into housing portion 22, to seal the hollow fibers therein. Member 38 may, for example, be an adhesive tape, or a piece of flat plastic. In a thermoforming step, housing 22 may be formed around bundle 37 for an alternative manufacturing process.

Hollow fibers 37 may be conventional, cellulose-based fibers for blood dialysis or the like, or alternatively they may be polypropylene fibers or the like for membrane plasmapheresis or oxygenation of blood. Alternatively, any desired kind of hollow fibers may be used, for example, larger pore hollow fibers for filtration or any other desired purpose.

The plastic material out of which integral structure 10 and its precurser parison is made may be any appropriate plastic material suitable for blow molding, for example glycol modified polyethylene terephthalate (PETG), polyethylene, polypropylene, or any of their suitable copolymers.

After insertion of hollow fiber bundle 37 and closing off of open end 26 with flat member 38, flashing material comprising the flat areas such as areas 16, 18, and 19 may be cut away, if desired, and integral structure 10 may be placed in a centrifuged device, the rotating head 40 of which is illustrated in FIG. 3.

In a typical process, centrifuge 40 is started, to rotate the integral structure 10 comprising housing portion 22 and elongated member 20 about an axis between its ends and preferably an axis extending through the midpoint of integral structure 10. Before or after the centrifuging process begins, the potting compound is inserted through aperture 36 of well member 32. As the centrifugal action takes place, the potting compound migrates in a known manner radially outwardly into end portions 26, 28, filling the ends of housing portion 22 and percolating in among the ends of fiber bundle 37, until the predetermined amount of potting compound placed into well 32 has migrated radially outwardly to fill ends 26, 28 of casing 10 to a desired level. The potting compound 42 is then allowed to cure in known manner, being shown in a final, cured position in FIG. 4.

Thereafter, transverse end cuts are made at positions 43 through the ends of housing 22, as indicated in FIG. 3, resulting in the separation of ends 26, 28, and elongated member 20, from the remainder of housing 22.

An end cap manifold member 46 may be applied to each cut end of housing 22 in the manner illustrated in FIG. 4. In this embodiment, enlarged flange members 48, formed in the blow molding process, may serve to isolate from bundle 37 the housing wall portion to which angled, annular inner surface 49 of each end cap member 46 may be ultrasonically sealed, spin welded, or otherwise permanently attached to the ends of housing 22.

As the result of this, each end cap member 46, having its access port 50, may be in flow communication with the bores of the hollow fibers of bundler 37, so that blood or other fluid may pass from one end cap member 46 through the bores of the bundle 37, to exit via another end cap member 46 of similar design at the other end of housing 22. At the same time, ports 23 provide a counterflow, if desired, of another fluid, for example, dialysis solution, which percolates through bundle 37 in contact with the exterior surfaces of the individual hollow fibers. Alternatively, ports 23 may be used as drains for plasma or other material that has diffused through the hollow fibers of bundle 37. Otherwise, an alternate filtration circuit may be used, extending between ports 50 and ports 23 in which case it may be desired for only one port 50 to be present, and the other end cap to be solid, and only one side port 23 to be present.

Referring to FIG. 5, a modified, integral structure in accordance with this invention is disclosed. Modified, integral structure 10a may be blow molded from a single parison in a manner similar to that previously described and illustrated in FIG. 1. However, there is blow molded out of this parison specifically two, and optionally more, housing portions 22a, 22b, as well as an elongated chamber portion 20a, all being interconnected.

Elongated chamber portion 20a may be of substantially identical design to the previous, elongated chamber 20, communicating at its ends with the respective ends of tubular housing 22a as shown.

However, by way of further modification, the respective ends of housing portion 22a defined additional open channels 49 which, in turn, communicate with the respective ends 26b, 28b of tubular housing 22b.

Side ports 23a, 23b may define a continuous open tube extending between the respective housings 22a, 22b, being formed in the blow molding operation.

Accordingly, after blow molding of this structure, the flash material may be removed, as in the manner of the previous embodiment, and the structure may be mounted in a centrifuge, with aperture 36a being cut, and partitions 38a, 38b being heat sealed or glued on the open ends of housing portions 22a, 22b. The other ends of the housing portions are closed with sealed walls 30a, 30b as in the previous embodiment. The bundles of hollow fibers are, of course, installed prior to sealing with flat members 38a, 38b.

The centrifuge is then activated, with the potting compound being inserted through aperture 36a so that the potting compound migrates to the ends of housing 22a. Some potting compound then further migrates through channels 49 into the respective ends 26b, 28b of housing 22b. A sufficient amount of potting compound is added through aperture 36a so that the potting compound seeks its own radially outward level throughout the ends of housings 22a, 22b, a typical level of potting compound being shown by reference numbers 50, with corresponding potting compound levels being found in the ends of housings 22a, 22b.

After the potting compound has cured, the ends of housings 22a, 22b may be severed, typically at flanges 48a, 48b, and the adjoining side ports 23a, 23b may be severed in area 52 to provide a pair of separate, potted housings 22a, 22b. End caps of any desired design, particularly similar to end caps 46, may then be added by ultrasonic sealing or the like against the respective flanges 48a, 48b to complete the dialyzer or other separation device.

The potting compound used in this invention may be a conventional polyurethane potting compound typically used in hollow fiber dialyzer technology. Alternatively, a hot melt sealant may be used if desired which is sealingly compatible with the plastic material of housings 22a, 22b. Significant cost savings are contemplated with the use of less expensive hot melt material, when compared with the polyurethane.

As the result of this, significant improvements in the efficiencies and cost savings of manufacture of hollow fiber separation devices are provided by the invention of this application, with the reduction of piece parts and the elimination of the step of separate manufacture of the potting boat and housing and the bringing of them together for temporary interaction. Instead, one, and preferably a plurality, of housings are integrally blow molded, or, alternatively, thermoformed or otherwise produced as a single, integral piece. Significant amounts of centrifuging time per unit manufactured can be saved when integral structures in accordance with this invention are made with multiple housing portions, since, in that circumstance, two or more tubular housings can be simultaneously potted in a single centrifuge operation, for added cost savings.

The above has been offered for illustrative purposes only, and is not intended to limit the scope of the invention of this application, which is as defined in the claims below.

That which is claimed is:

1. In a method for making a hollow fiber separation device, the improvement comprising:
    forming an integral structure which comprises at least one tubular housing portion having a closed end and a pair of closed-end, laterally extending ports, and an elongated chamber portion extending in longitudinal relation to the tubular housing portion and communicating with the housing portion adjacent to opposed ends thereof;
    providing an aperture in the central area of said elongated chamber;
    inserting hollow fibers for diffusion into said housing portion through the housing end opposed to the closed end;
    closing the opposed end of said housing portion;
    spinning said structure about an axis between said ends;
    adding potting compound to said chamber portion through the aperture, wherey the potting compound migrates radially outwardly through the chamber to the closed ends of the housing portion to encase the ends of the hollow fibers in potting compound; and
    curing the potting compound.

2. The method of claim 1 in which a plurality of tubular housing portions are formed, said chamber portion and housing portions defining interconnecting channel means extending between areas adjacent the respective ends thereof for flow communication, whereby potting compound flows on spinning of said structure through said channel means into the ends of said plurality of tubular housing portions.

3. The method of claim 2 further including the step of separating said tubular housing portions from each other after curing the potting compound.

4. The method of claim 1 including the steps of transversely cutting the ends of the tubular housing portion through the potting compound after curing to expose open bores of the hollow fibers and removing the chamber portion, and applying flow manifold members to the cut, tubular housing ends.

5. The method of claim 1 in which said step of forming the integral structure is done by blow molding.

6. The method of making a hollow fiber separation device, which comprises:
    blow molding an integral structure which comprises a plurality of tubular housing portions and an elongated chamber portion extending in longitudinal relation to the tubular housing portions and communicating with one of the housing portions adjacent opposed ends thereof, and simultaneously forming interconnecting channel means between respective ends of said housing portions for flow communication;
    providing an aperture in a central area of said elongated chamber;
    inserting hollow fibers or diffusion into each housing portion;
    spinning said structure about an axis between said ends;
    adding potting compound to said chamber portion through the aperture, whereby the potting compound migrates radially outwardly through the chamber to the closed ends of the housing portions to encase the ends of the hollow fibers in potting compound;
    curing the potting compound;
    transversely cutting the ends of the tubular housing portions through the potting compound to expose open bores of the hollow fibers and removing the chamber portion;
    separating the housing portions; and
    applying flow manifold members to the cut tubular housing ends.

7. The method of claim 6 in which a pair of said housing portions defines a pair of interconnecting side ports, and further including the step of severing said interconnecting side ports as at least part of separating said housing portions.

8. In a method for making a hollow fiber separation device, the improvement comprising:
    blow molding an integral structure which comprises at least one tubular housing portion having one closed end, a pair of closed-end, laterally extending ports, and one open end, and an elongated chamber portion extending in longitudinal relation to the tubular housing portion and communicating with the housing portion adjacent to the opposed ends thereof;
    providing an aperture in a central area of said elongated chamber;
    inserting hollow fibers for diffusion into said housing portion through said open end;
    sealingly attaching a flat member across said open end to close said open end;
    spinning said structure about an axis between said ends;
    adding potting compound to said chamber portion through the aperture, whereby the potting compound migrates radially outwardly through the chamber to the closed ends of the housing portion to encase the ends of the hollow fibers in potting compound; and curing the potting compound.

9. The method of claim 8 including the steps of transversely cutting the ends of the tubular housing portion through the potting compound after curing to expose open bores of the hollow fibers and removing the chamber portion, and applying flow manifold members to the cut, tubular housing ends.

10. The method of claim 9 in which a plurality of tubular housing portions are formed, said chamber portion and housing portions defining innerconnecting channel means extending between areas adjacent the respective ends thereof for flow communication, whereby potting compound flows on spinning of said structure through said channel means into the ends of said plurality of tubular housing portions.

11. The method of claim 10 further including the step of separating said tubular housing portions from each other after curing the potting compound.

* * * * *